United States Patent
Tsfati et al.

(10) Patent No.: US 8,140,031 B2
(45) Date of Patent: Mar. 20, 2012

(54) TRANSMITTER BUILT-IN PRODUCTION LINE TESTING UTILIZING DIGITAL GAIN CALIBRATION

(75) Inventors: Yossi Tsfati, Le Zion (IL); Nir Tal, Haifa (IL); Avi Baum, Givat-Shmuel (IL); Itay Sherman, Ra'anana (IL)

(73) Assignee: Texas Instruments Incorporated, Dallas, TX (US)

( * ) Notice: Subject to any disclaimer, the term of this patent is extended or adjusted under 35 U.S.C. 154(b) by 836 days.

(21) Appl. No.: 11/949,611

(22) Filed: Dec. 3, 2007

(65) Prior Publication Data

US 2008/0144707 A1    Jun. 19, 2008

Related U.S. Application Data

(60) Provisional application No. 60/870,763, filed on Dec. 19, 2006.

(51) Int. Cl.
*H04B 1/04* (2006.01)
*H04K 3/00* (2006.01)

(52) U.S. Cl. ............... 455/114.3; 455/126; 455/127.2; 375/296

(58) Field of Classification Search ........... 455/114.3, 455/115.1, 115.4, 126, 127.2, 127.3; 375/296, 375/297
See application file for complete search history.

(56) References Cited

U.S. PATENT DOCUMENTS

| | | | |
|---|---|---|---|
| 6,809,598 B1 | 10/2004 | Staszewski et al. | 331/16 |
| 2004/0151257 A1* | 8/2004 | Staszewski et al. | 375/296 |
| 2006/0033582 A1 | 2/2006 | Staszewski et al. | |
| 2006/0038710 A1 | 2/2006 | Staszewski et al. | |
| 2008/0002786 A1* | 1/2008 | Kerth et al. | 375/297 |

* cited by examiner

*Primary Examiner* — Lee Nguyen
(74) *Attorney, Agent, or Firm* — Ronald O. Neerings; Wade James Brady, III; Frederick J. Telecky, Jr.

(57) ABSTRACT

A novel and useful self-calibration based production line testing mechanism utilizing built-in closed loop measurements in the radio to calibrate the output power of an external power amplifier coupled to a SoC radio. The mechanism is applicable during production line testing and calibration which is performed on each SoC and associated external power amplifier after assembly at the target PCB of the final product. The mechanism calibrates the TX output power in three phases based on loopback EVM measurements. In a first phase, the PPA in the radio (SoC) is calibrated and gain versus output power is stored in a gain table in on-chip NVS. In a second phase, the maximum PPA TX power is determined using closed loop EVM measurements. The external PA is calibrated in a third phase and the maximum PA power is determined. During this third phase, the maximum power of the device is calculated, compared to the requirements of the particular standard and a pass/fail determination is thereby made.

25 Claims, 10 Drawing Sheets

TRANSMITTER BUILT-IN PRODUCTION LINE TESTING UTILIZING DIGITAL GAIN CALIBRATION

REFERENCE TO PRIORITY APPLICATION

This application claims priority to U.S. Provisional Application Ser. No. 60/870,763, filed Dec. 19, 2006, entitled "Transmitter Built-In Production Line Testing," incorporated herein by reference in its entirety.

FIELD OF THE INVENTION

The present invention relates to the field of data communications and more particularly relates to a built-in production line testing mechanism that utilizes self-calibration techniques to calibrate the digital gain of an external power amplifier that significantly reduces the cost of production testing radio frequency (RF) transmitters.

BACKGROUND OF THE INVENTION

Wireless communication transmitters that are used to carry high linear modulation formatted signals, such as Wireless LAN (WLAN) signals, are often required to transmit relatively high transmit power. At high transmitted power levels, however, the noise floor (also referred to as the Error Vector Magnitude or EVM) contribution from the power amplifier (PA) becomes high as well.

Manufacturers designing and building products such as communication devices, often design their products to operate in accordance with industry standards. Often, the transmitter is built to implement a wireless standard such as WLAN, GSM, Bluetooth, etc. In order to meet the EVM requirements of the standard, the power of the signal input to the power amplifier must be calibrated so that the EVM will meet the requirements imposed by the standard. Typically, the transmitter is calibrated during production line testing of the solution (comprising the chip or SoC and the external power amplifier) which is performed per device on the target PCB.

Prior art testing of communication devices requires the device to be connected to one or more pieces of external test equipment that perform a battery of tests to ensure compliance with the specifications. The test equipment used is typically bulky in size, costly and requires routine maintenance and calibration of its own.

A diagram illustrating an example prior art production line testing scenario is shown in FIG. 1. The test setup, generally referenced 10, comprises a phone printed circuit board (PCB) 12, power meter test equipment 14, EVM meter and spectrum plot test equipment 16 and a PC or other computing means 18 running the prior art calibration control process. The DUT 20 comprises the WLAN chip or integrated circuit (IC) 22 and external front end module (FEM) 24.

In operation, the prior art calibration and control process controls the DUT via the data/control lines 29. Measurements of the RF output 21 from the FEM are taken via the power meter 14 and the EVM meter/spectrum plot 16. The measurement results from the power meter and EVM meter are read by the calibration control process via data/control lines 28, 26, respectively.

Existing production line testing techniques requires one or more measurements of the TX output power and/or other signals using external test equipment and the storing of the results in non-volatile storage (NVS). The testing is performed on the cell phone production line whereby the test equipment communicates extensively with the cell phone SoC, PCB assemblies, etc. which consumes a considerable amount of time thus making this testing process very costly.

There is thus a need for a mechanism that is capable of calibrating the digital gain of the power amplifier that is required to maximize the EVM and spectral mask of the radio. The mechanism preferably does not require the use of expensive test equipment or require long expensive test time on the production line.

SUMMARY OF THE INVENTION

The present invention is a novel and useful self-calibration based production line testing mechanism that utilizes built-in closed loop measurements in the radio to calibrate the digital gain of an external power amplifier coupled to a SoC radio. The production line testing mechanism of the invention is particularly suitable for use in radios employing identical IF frequencies for transmit and receive. In the example presented hereinbelow, the WLAN transmitter and receiver use zero IF (ZIF) thus simplifying the implementation.

In operation, the mechanism calibrates the TX output power in three phases which are based on loopback EVM measurements using either (1) the transmitter and receiver portions of a single radio, or (2) the transmitter of one radio and the receiver of a second radio. The three phases include (1) calibration of the PPA in the radio (SoC) and storing gain versus output power in a gain table stored in NVS; (2) determination of the maximum PPA TX power using closed loop EVM measurements; and (3) calibration of the external PA and determination of maximum PA power. The three phases may be implemented together or each can be implemented at different times. For example, the first phase of PPA calibration may be performed during fabrication and test of the single chip radio SoC incorporating the transmitter and receiver components, while the second and third phases may be performed at a different time after the single chip radio is inserted in a circuit module incorporating an external PA.

Advantages of the reference frequency dithering mechanism include (1) a significant reduction of production line testing costs as there is no need to communicate with external test equipment for calibration during final testing of the device, thereby greatly reducing the calibration time; and (2) manufacturers of modules incorporating both the SoC and the PA FEM, there is no need to perform a separate calibration of the FEM using external test equipment and associated storage of the results, since the calibration is now performed after the module is assembled at the PCB stage, e.g., after the module is assembled in the module PCB.

Note that some aspects of the invention described herein may be constructed as software objects that are executed in embedded devices as firmware, software objects that are executed as part of a software application on either an embedded or non-embedded computer system such as a digital signal processor (DSP), microcomputer, minicomputer, microprocessor, etc. running a real-time operating system such as WinCE, Symbian, OSE, Embedded LINUX, etc. or non-real time operating system such as Windows, UNIX, LINUX, etc., or as soft core realized HDL circuits embodied in an Application. Specific Integrated Circuit (ASIC) or Field Programmable Gate Array (FPGA), or as functionally equivalent discrete hardware components.

There is thus provided in accordance with the invention, a method of calibrating an external power amplifier comprising a power detector, the external power amplifier coupled to the output of a transmitter incorporating a pre-power amplifier (PPA), the method comprising the steps of performing closed loop calibration of an input signal to yield a maximum level of the external power amplifier that is within predetermined transmission requirements, measuring a gain of the external power amplifier and calibrating the power detector gain.

There is also provided in accordance with the invention, a method of calibrating an external power amplifier utilizing a transmitter incorporating a pre-power amplifier (PPA), the method comprising the steps of determining a maximum PPA codeword that yields maximum output power of the external power amplifier (PA) while meeting predetermined transmission requirements and translating the maximum PPA codeword into a maximum PPA output power level utilizing a PPA gain table generated previously and measuring power amplifier gain by injecting signals with known PPA output power into the external power amplifier, calculating a maximum power amplifier output power level as a function of the maximum PPA output power level and adjusting the maximum PPA codeword to meet the predetermined transmission requirements.

There is further provided in accordance with the invention, a method of calibrating an external power amplifier utilizing a transmitter incorporating a pre-power amplifier (PPA), the method comprising the steps of injecting samples into a transmit path, downconverting and demodulating a receive signal leaked through the external power amplifier, increasing transmit power of the PPA until a maximum power amplifier output level is reached that still meets the predetermined transmission requirements, translating the maximum PPA codeword into a maximum PPA output power level utilizing a PPA gain table generated previously, injecting signals into the transmit path with known PPA output power and determining a gain of the external power amplifier, calculating a maximum power amplifier output power level as a function of the maximum PPA output power level and adjusting the maximum PPA codeword to meet the predetermined transmission requirements.

There is also provided in accordance with the invention, an apparatus comprising a transmitter incorporating a pre-power amplifier (PPA), a receiver, wherein the transmitter and the receiver are capable of operating simultaneously, a processor coupled to the transmitter and the receiver, the processor comprising program code means for calibrating an external power amplifier coupled to the transmitter when executed on the processor; the program code means adapted to determine a maximum PPA codeword that yields maximum output power of the external power amplifier (PA) while meeting predetermined transmission requirements and translate the maximum PPA codeword into a maximum PPA output power level utilizing a PPA gain table generated previously and measure power amplifier gain by injecting signals with known PPA output power into the external power amplifier, calculate a maximum power amplifier output power level as a function of the maximum PPA output power level and adjust the maximum PPA codeword to meet the predetermined transmission requirements.

There is also provided in accordance with the invention, a single chip radio comprising a transmitter incorporating a pre-power amplifier (PPA), a receiver capable of receiving while the transmitter is transmitting, memory storage coupled to the transmitter, a processor coupled to the transmitter and the receiver, the processor comprising program code means for operative to calibrate an external power amplifier coupled to the transmitter when executed on the processor; the program code means adapted to inject samples from the memory storage into a transmit path, downconvert and demodulate a receive signal leaked through the external power amplifier, increase the transmit power of the PPA until a maximum power amplifier output level is reached that still meets the predetermined transmission requirements, translate the maximum PPA codeword into a maximum PPA output power level utilizing a PPA gain table generated previously, inject signals stored in the memory storage into the transmit path with known PPA output power and determine a gain of the external power amplifier, calculate a maximum power amplifier output power level as a function of the maximum PPA output power level and adjust the maximum PPA codeword to meet the predetermined transmission requirements.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
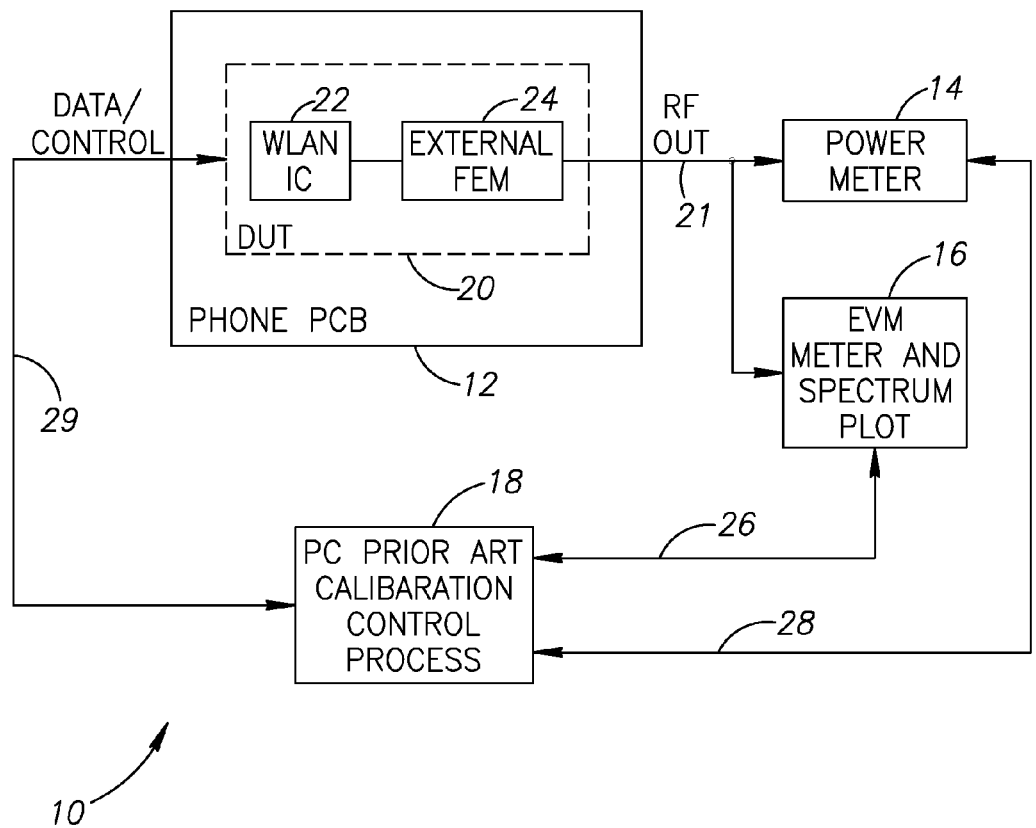
FIG. 1 is a diagram illustrating an example prior art production line testing scenario.

The following notation is used throughout this document.

| Term | Definition |
| --- | --- |
| AC | Alternating Current |
| ACW | Amplitude Control Word |
| ADC | Analog to Digital Converter |
| ADPLL | All Digital Phase Locked Loop |
| AM | Amplitude Modulation |
| ASIC | Application Specific Integrated Circuit |
| AVI | Audio Video Interface |
| BIST | Built-In Self Test |
| BMP | Windows Bitmap |
| BPF | Band Pass Filter |
| BPSK | Binary Phase Shift Keying |
| CMOS | Complementary Metal Oxide Semiconductor |
| CPU | Central Processing Unit |
| CW | Continuous Wave |
| DBB | Digital Baseband |
| DC | Direct Current |
| DCO | Digitally Controlled Oscillator |
| DCXO | Digitally Controlled Crystal Oscillator |
| DPA | Digitally Controlled Power Amplifier |
| DRAC | Digital to RF Amplitude Conversion |
| DRP | Digital RF Processor or Digital Radio Processor |

-continued

| Term | Definition |
| --- | --- |
| DSL | Digital Subscriber Line |
| DSP | Digital Signal Processor |
| DUT | Device Under Test |
| EDGE | Enhanced Data Rates for GSM Evolution |
| EDR | Enhanced Data Rate |
| EPROM | Erasable Programmable Read Only Memory |
| EVM | Error Vector Magnitude |
| FCW | Frequency Command Word |
| FEM | Front End Module |
| FFT | Fast Fourier Transform |
| FIB | Focused Ion Beam |
| FM | Frequency Modulation |
| FPGA | Field Programmable Gate Array |
| GMSK | Gaussian Minimum Shift Keying |
| GPS | Global Positioning System |
| GSM | Global System for Mobile communications |
| HB | High Band |
| HDL | Hardware Description Language |
| IC | Integrated Circuit |
| IEEE | Institute of Electrical and Electronics Engineers |
| IF | Intermediate Frequency |
| IIR | Infinite Impulse Response |
| JPG | Joint Photographic Experts Group |
| LAN | Local Area Network |
| LB | Low Band |
| LDO | Low Drop Out |
| LNA | Low Noise Amplifier |
| LO | Local Oscillator |
| MBOA | Multiband OFDM Alliance |
| MIM | Metal Insulator Metal |
| MOS | Metal Oxide Semiconductor |
| MP3 | MPEG-1 Audio Layer 3 |
| MPG | Moving Picture Experts Group |
| NVS | Non-Volatile Storage |
| PA | Power Amplifier |
| PC | Personal Computer |
| PCB | Printed Circuit Board |
| PDA | Personal Digital Assistant |
| PHE | Phase Error |
| PLL | Phase Locked Loop |
| PM | Power Management |
| PM | Phase Modulation |
| PPA | Pre-Power Amplifier |
| RAM | Random Access Memory |
| RF | Radio Frequency |
| RFBIST | RF Built-In Self Test |
| RMS | Root Mean Squared |
| ROM | Read Only Memory |
| SAM | Sigma-Delta Amplitude Modulation |
| SAW | Surface Acoustic Wave |
| SIM | Subscriber Identity Module |
| SoC | System on Chip |
| SRAM | Static Read Only Memory |
| TDC | Time to Digital Converter |
| TV | Television |
| USB | Universal Serial Bus |
| UWB | Ultra Wideband |
| VCO | Voltage Controlled Oscillator |
| WCDMA | Wideband Code Division Multiple Access |
| WiFi | Wireless Fidelity |
| WiMAX | Worldwide Interoperability for Microwave Access |
| WiMedia | Radio platform for UWB |
| WLAN | Wireless Local Area Network |
| WMA | Windows Media Audio |
| WMV | Windows Media Video |
| WPAN | Wireless Personal Area Network |
| ZIF | Zero IF |

DETAILED DESCRIPTION OF THE INVENTION

The present invention is a novel and useful self-calibration based production line testing mechanism that utilizes built-in closed loop measurements in the radio to calibrate the digital gain of an external power amplifier coupled to a SoC radio. The production line testing mechanism of the invention is particularly suitable for use in radios employing identical IF frequencies for transmit and receive. In the example presented hereinbelow, the WLAN transmitter and receiver use zero IF (ZIF) thus simplifying the implementation.

In operation, the mechanism calibrates the TX output power in three phases which are based on loopback EVM measurements using either (1) the transmitter and receiver portions of a single radio, or (2) the transmitter of one radio and the receiver of a second radio. The three phases include (1) calibration of the PPA in the radio (SoC) and storing gain versus output power in a gain table stored in NVS; (2) determination of the maximum PPA TX power using closed loop EVM measurements; and (3) calibration of the external PA and determination of maximum PA power. The three phases may be implemented together or each can be implemented at different times. For example, the first phase of PPA calibration may be performed during fabrication and test of the single chip radio SoC incorporating the transmitter and receiver components, while the second and third phases may be performed at a different time after the single chip radio is inserted in a circuit module incorporating an external PA.

Although the production line testing mechanism is applicable to numerous wireless communication standards and can be incorporated in numerous types of wireless or wired communication devices such a multimedia player, mobile station, cellular phone, PDA, DSL modem, WPAN device, etc., it is described in the context of a digital RF processor (DRP) based transmitter that may be adapted to comply with a particular wireless communications standard such as GSM, Bluetooth, EDGE, WCDMA, WLAN, WiMax, etc. It is appreciated, however, that the invention is not limited to use with any particular communication standard and may be used in optical, wired and wireless applications. Further, the invention is not limited to use with a specific modulation scheme but is applicable to any modulation scheme including both digital and analog modulations.

Note that throughout this document, the term communications device is defined as any apparatus or mechanism adapted to transmit, receive or transmit and receive data through a medium. The term communications transceiver or communications device is defined as any apparatus or mechanism adapted to transmit and receive data through a medium. The communications device or communications transceiver may be adapted to communicate over any suitable medium, including wireless or wired media. Examples of wireless media include RF, infrared, optical, microwave, UWB, Bluetooth, WiMAX, WiMedia, WiFi, or any other broadband medium, etc. Examples of wired media include twisted pair, coaxial, optical fiber, any wired interface (e.g., USB, Firewire, Ethernet, etc.). The term Ethernet network is defined as a network compatible with any of the IEEE 802.3 Ethernet standards, including but not limited to 10 Base-T, 100Base-T or 1000Base-T over shielded or unshielded twisted pair wiring. The terms communications channel, link and cable are used interchangeably. The notation DRP is intended to denote either a Digital RF Processor or Digital Radio Processor. References to a Digital RF Processor infer a reference to a Digital Radio Processor and vice versa.

The term multimedia player or device is defined as any apparatus having a display screen and user input means that is capable of playing audio (e.g., MP3, WMA, etc.), video (AVI, MPG, WMV, etc.) and/or pictures (JPG, BMP, etc.). The user input means is typically formed of one or more manually operated switches, buttons, wheels or other user input means. Examples of multimedia devices include pocket sized personal digital assistants (PDAs), personal media player/recorders, cellular telephones, handheld devices, and the like.

Some portions of the detailed descriptions which follow are presented in terms of procedures, logic blocks, processing, steps, and other symbolic representations of operations on data bits within a computer memory. These descriptions and representations are the means used by those skilled in the data processing arts to most effectively convey the substance of their work to others skilled in the art. A procedure, logic block, process, etc., is generally conceived to be a self-consistent sequence of steps or instructions leading to a desired result. The steps require physical manipulations of physical quantities. Usually, though not necessarily, these quantities take the form of electrical or magnetic signals capable of being stored, transferred, combined, compared and otherwise manipulated in a computer system. It has proven convenient at times, principally for reasons of common usage, to refer to these signals as bits, bytes, words, values, elements, symbols, characters, terms, numbers, or the like.

It should be born in mind that all of the above and similar terms are to be associated with the appropriate physical quantities they represent and are merely convenient labels applied to these quantities. Unless specifically stated otherwise as apparent from the following discussions, it is appreciated that throughout the present invention, discussions utilizing terms such as 'processing,' 'computing,' 'calculating,' 'determining,' 'displaying' or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention can take the form of an entirely hardware embodiment, an entirely software embodiment or an embodiment containing a combination of hardware and software elements. In one embodiment, a portion of the mechanism of the invention is implemented in software, which includes but is not limited to firmware, resident software, object code, assembly code, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium is any apparatus that can contain, store, communicate, propagate, or transport the program for use by or in connection with the instruction execution system, apparatus, or device, e.g., floppy disks, removable hard drives, computer files comprising source code or object code, flash semiconductor memory (USB flash drives, etc.), ROM, EPROM, or other semiconductor memory devices.

Single Chip Radio

Figure 2:
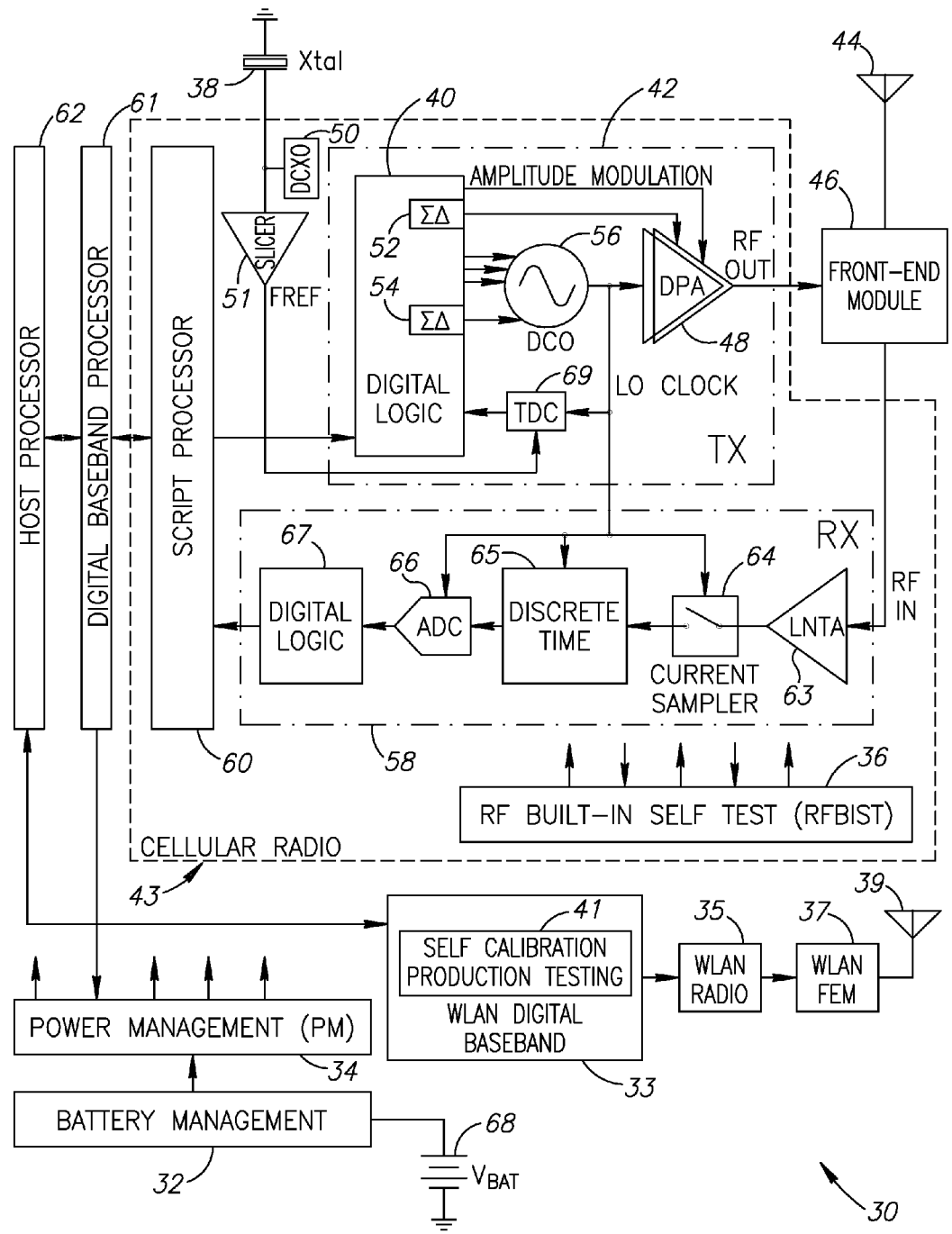
FIG. 2 is a block diagram illustrating a single chip polar transceiver radio incorporating an all-digital local oscillator based transmitter and receiver incorporating the transmitter production line testing mechanism of the present invention.

A block diagram illustrating a single chip polar transceiver radio incorporating an all-digital local oscillator based transmitter and receiver incorporating the transmitter production line testing mechanism of the present invention is shown in FIG. 2. For illustration purposes only, the transmitter, as shown, is adapted for the GSM/EDGE/WCDMA cellular standards. It is appreciated, however, that one skilled in the communication arts can adapt the transmitter illustrated herein to other modulations and communication standards as well without departing from the spirit and scope of the present invention.

The SoC radio circuit, generally referenced 30, comprises a cellular radio integrated circuit 43 coupled to a crystal 38, digital baseband (DBB) processor 61, host processor 62, cellular front end module 46 coupled to antenna 44, power management block 34, battery management circuit 32 coupled to battery 68 and WLAN transceiver 31 (excluding WLAN FEM 37). The cellular radio chip 43 comprises a script processor 60, memory (not shown) such as static RAM, TX block 42, RX block 58, digitally controlled crystal oscillator (DCXO) 50, slicer 51 and RF built-in self test (BIST) 36. The TX block comprises high speed and low speed digital logic block 40 including $\Sigma\Delta$ modulators 52, 54, digitally controlled oscillator (DCO) 56 and digitally controlled power amplifier (DPA) 48 (also referred to as the pre-power amplifier (PPA)). The ADPLL in the transmitter functions to generate various radio frequency signals. The RX block comprises a low noise transconductance amplifier 63, current sampler 64, discrete time processing block 65, analog to digital converter (ADC) 66 and digital logic block 67.

In accordance with the invention, the SoC also comprises WLAN transceiver 31 which comprises the WLAN digital baseband 33 including the self-calibration production testing block 41 of the present invention and WLAN radio 35. The transceiver also encompasses WLAN FEM 37 which is coupled to WLAN antenna 39. The WLAN FEM 37, however, typically is located external to the SoC in a separate IC. In operation, the WLAN digital baseband is operative to interface to the host processor 62. The self-calibration production testing block 41 is operative to implement the built-in production line testing mechanism which calibrates the digital gain of a power amplifier in the external WLAN FEM 37, described in more detail infra.

The principles presented herein have been used to develop three generations of a Digital RF Processor (DRP): single-chip Bluetooth, GSM and GSM/EDGE radios realized in 130 nm, 90 nm and 65 nm digital CMOS process technologies, respectively. The common architecture is highlighted in FIG. 2 with features added specific to the cellular radio. In this example cellular radio, the all digital phase locked loop (ADPLL) based transmitter employs a polar architecture with all digital phase/frequency and amplitude modulation paths. The receiver employs a discrete-time architecture in which the RF signal is directly sampled and processed using analog and digital signal processing techniques.

A key component is the digitally controlled oscillator (DCO) 56, which avoids any analog tuning controls. A digitally-controlled crystal oscillator (DCXO) generates a high-quality base station-synchronized frequency reference such that the transmitted carrier frequencies and the received symbol rates are accurate to within 0.1 ppm. Fine frequency resolution is achieved through high-speed $\Sigma\Delta$ dithering of its varactors. Digital logic built around the DCO realizes an all-digital PLL (ADPLL) that is used as a local oscillator for both the transmitter and receiver. The polar transmitter architecture utilizes the wideband direct frequency modulation capability of the ADPLL and a digitally controlled power amplifier (DPA) 300 for the amplitude modulation. The DPA operates in near-class-E mode and uses an array of nMOS transistor switches to regulate the RF amplitude and acts as a digital-to-RF amplitude converter (DRAC). It is followed by a matching network and an external cellular front-end module 46, which comprises a power amplifier (PA), a transmit/receive switch for the common antenna 44 and RX surface acoustic wave (SAW) filters. Fine amplitude resolution is achieved through high-speed $\Sigma\Delta$ dithering of the DPA nMOS transistors.

The receiver 58 employs a discrete-time architecture in which the RF signal is directly sampled at the Nyquist rate of the RF carrier and processed using analog and digital signal processing techniques. The transceiver is integrated with a script processor 60, dedicated digital base band processor 61 (i.e. ARM family processor or DSP), SRAM or other memory (not shown) and an interface to host processor 62. The script processor handles various TX and RX calibration, compensation, sequencing and lower-rate data path tasks and encapsulates the transceiver complexity in order to present a much simpler software programming model.

The frequency reference (FREF) is generated on-chip by a 26 MHz (could be 38.4 MHz or other) digitally controlled crystal oscillator (DCXO) 50 coupled to slicer 51. An integrated power management (PM) system 34 is connected to an external battery management circuit 32 that conditions and stabilizes the supply voltage. The PM comprises multiple low drop out (LDO) regulators that provide internal supply voltages and also isolate supply noise between circuits, especially protecting the DCO. The RF built-in self-test (RFBIST) 36 performs autonomous phase noise and modulation distortion testing, various loopback configurations for bit-error rate measurements and optionally implements a DPA calibration and BIST mechanism. The transceiver is integrated with the digital baseband, SRAM memory in a complete system-on-chip (SoC) solution. Almost all the clocks on this SoC are derived from and are synchronous to the RF oscillator clock. This helps to reduce susceptibility to the noise generated through clocking of the massive digital logic.

The transmitter comprises a polar architecture in which the amplitude and phase/frequency modulations are implemented in separate paths. Transmitted symbols generated in the digital baseband (DBB) processor are first pulse-shape filtered in the Cartesian coordinate system. The filtered in-phase (I) and quadrature (Q) samples are then converted through a CORDIC algorithm into amplitude and phase samples of the polar coordinate system. The phase is then differentiated to obtain frequency deviation. The polar signals are subsequently conditioned through signal processing to sufficiently increase the sampling rate in order to reduce the quantization noise density and lessen the effects of the modulating spectrum replicas.

A more detailed description of the operation of the ADPLL can be found in U.S. Patent Publication No. 2006/0033582A1, published Feb. 16, 2006, to Staszewski et al., entitled "Gain Calibration of a Digital Controlled Oscillator," U.S. Patent Publication No. 2006/0038710A1, published Feb. 23, 2006, Staszewski et al., entitled "Hybrid Polar/Cartesian Digital Modulator" and U.S. Pat. No. 6,809,598, to Staszewski et al., entitled "Hybrid Of Predictive And Closed-Loop Phase-Domain Digital PLL Architecture," all of which are incorporated herein by reference in their entirety.

Mobile Device/Cellular Phone/PDA System

Figure 3:
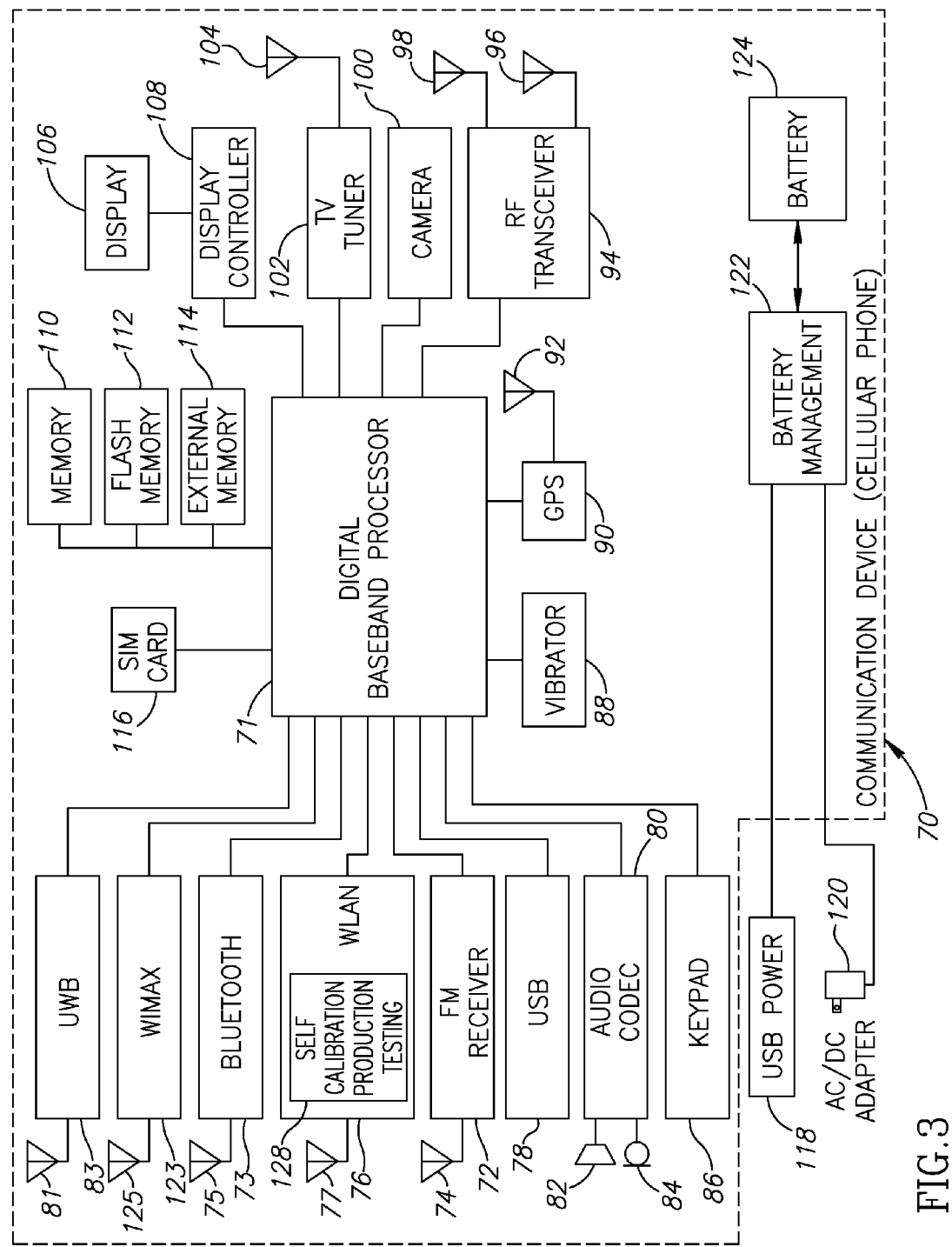
FIG. 3 is a simplified block diagram illustrating an example mobile communication device incorporating the transmitter production line testing mechanism of the present invention.

A simplified block diagram illustrating an example communication device incorporating the transmitter production line testing mechanism of the present invention is shown in FIG. 3. The communication device may comprise any suitable wired or wireless device such as a multimedia player, mobile station, mobile device, cellular phone, PDA, wireless personal area network (WPAN) device, Bluetooth EDR device, etc. For illustration purposes only, the communication device is shown as a cellular phone or smart phone. Note that this example is not intended to limit the scope of the invention as the transmitter production line testing mechanism of the present invention can be implemented in a wide variety of wireless and wired communication devices.

The cellular phone, generally referenced 70, comprises a baseband processor or CPU 71 having analog and digital portions. The basic cellular link is provided by the RF transceiver 94 and related one or more antennas 96, 98. A plurality of antennas is used to provide antenna diversity which yields improved radio performance. The cell phone also comprises internal RAM and ROM memory 110, Flash memory 112 and external memory 114.

Several user interface devices include microphone 84, speaker 82 and associated audio codec 80, a keypad for entering dialing digits 86, vibrator 88 for alerting a user, camera and related circuitry 100, a TV tuner 102 and associated antenna 104, display 106 and associated display controller 108 and GPS receiver 90 and associated antenna 92.

A USB interface connection 78 provides a serial link to a user's PC or other device. An FM receiver 72 and antenna 74 provide the user the ability to listen to FM broadcasts. WLAN radio and interface 76 and antenna 77 provide wireless connectivity when in a hot spot or within the range of an ad hoc, infrastructure or mesh based wireless LAN network. A Bluetooth EDR radio and interface 73 and antenna 75 provide Bluetooth wireless connectivity when within the range of a Bluetooth wireless network. Further, the communication device 70 may also comprise a WiMAX radio and interface 123 and antenna 125. SIM card 116 provides the interface to a user's SIM card for storing user data such as address book entries, etc. The communication device 70 also comprises an Ultra Wideband (UWB) radio and interface 83 and antenna 81. The UWB radio typically comprises an MBOA-UWB based radio.

In accordance with the invention, the WLAN radio transceiver comprises a processing block 128 operative to implement the self-calibration based transmitter production line testing mechanism of the present invention, as described in more detail infra. In operation, the self-calibration based transmitter production line testing mechanism may be implemented as hardware, as software executed as a task on the baseband processor 71 or a combination of hardware and software. Implemented as a software task, the program code operative to implement the self-calibration based transmitter production line testing mechanism of the present invention is stored in one or more memories 110, 112 or 114.

Portable power is provided by the battery 124 coupled to battery management circuitry 122. External power is provided via USB power 118 or an AC/DC adapter 120 connected to the battery management circuitry which is operative to manage the charging and discharging of the battery 124.

Production Line Testing Mechanism

As stated supra, the invention is operative to eliminate the need for the interaction with external test equipment and storage of associated data in non-volatile storage (NVS), as is required in prior art production line testing (PLT) environments. Rather, the invention uses built-in closed loop measurements to calibrate the digital gain of the external power amplifier which is needed to achieve maximum error vector magnitude (EVM). To verify that the external power amplifier is functioning and operational, the test mechanism of the present invention checks if the output signal passes a transmit power threshold. This check is performed using (1) the power detector element built into the external power amplifier or, alternatively, (2) an external power meter.

Figure 4:
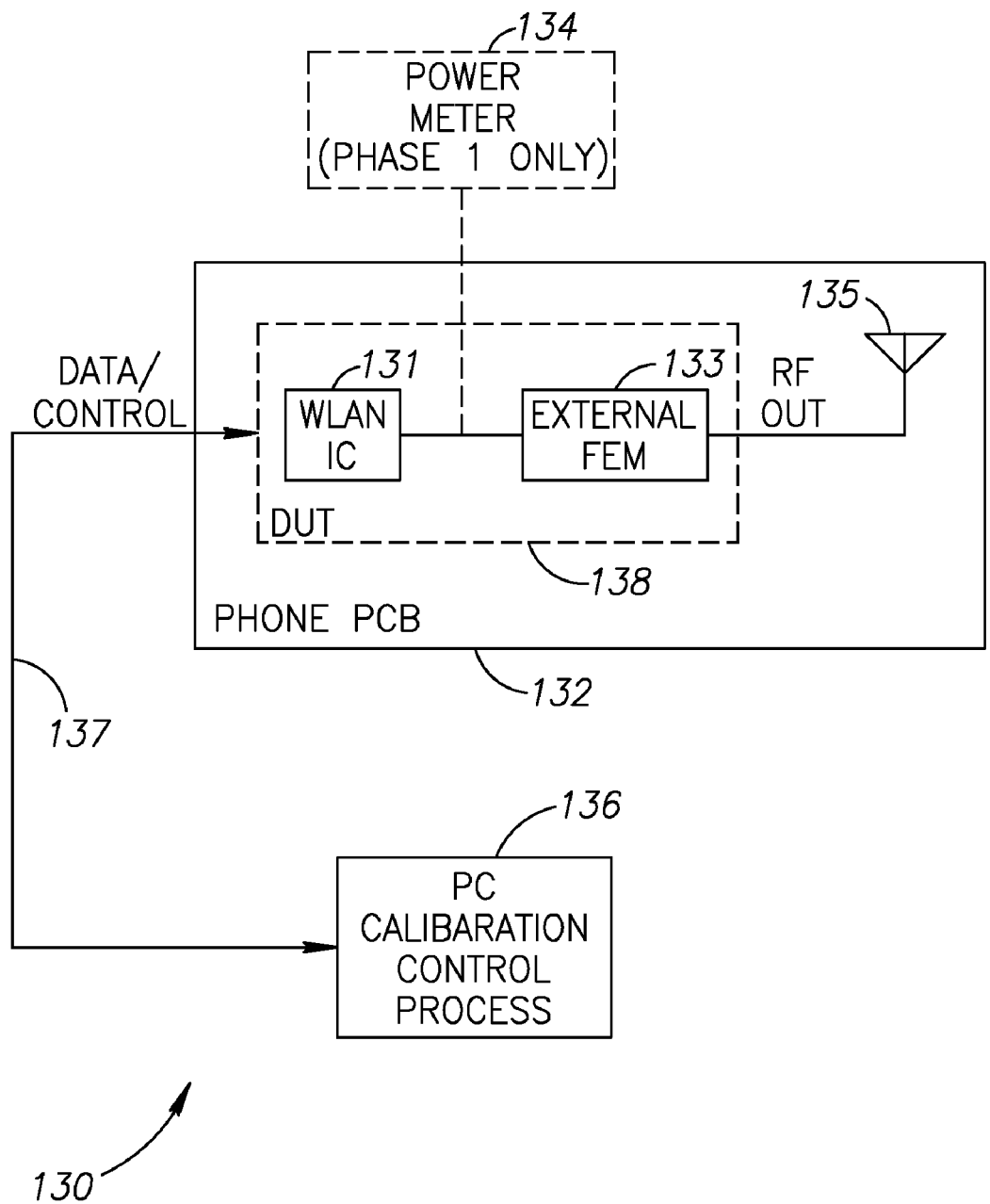
FIG. 4 is a block diagram illustrating an example production line testing utilizing the transmitter production line testing mechanism of the present invention.

A block diagram illustrating an example production line testing utilizing the transmitter production line testing mechanism of the present invention is shown in FIG. 4. The testing set-up, generally referenced 130, comprises only a PC or other computing means based calibration control process 136 in communication with the phone PCB 132 via data/control signal lines 137. The phone PCB comprises the DUT 138 which, in this example embodiment, includes the WLAN IC 131 and external FEM 133. The output of the PPA in the WLAN IC is input to the PA in the external FEM. The RF output from the external FEM is coupled to antenna 135. In addition, the power meter 134 is used only to calibrate the PPA during the first phase of the transmitter production line testing mechanism (indicated by dashed box), as described in more detail infra.

Figure 5:
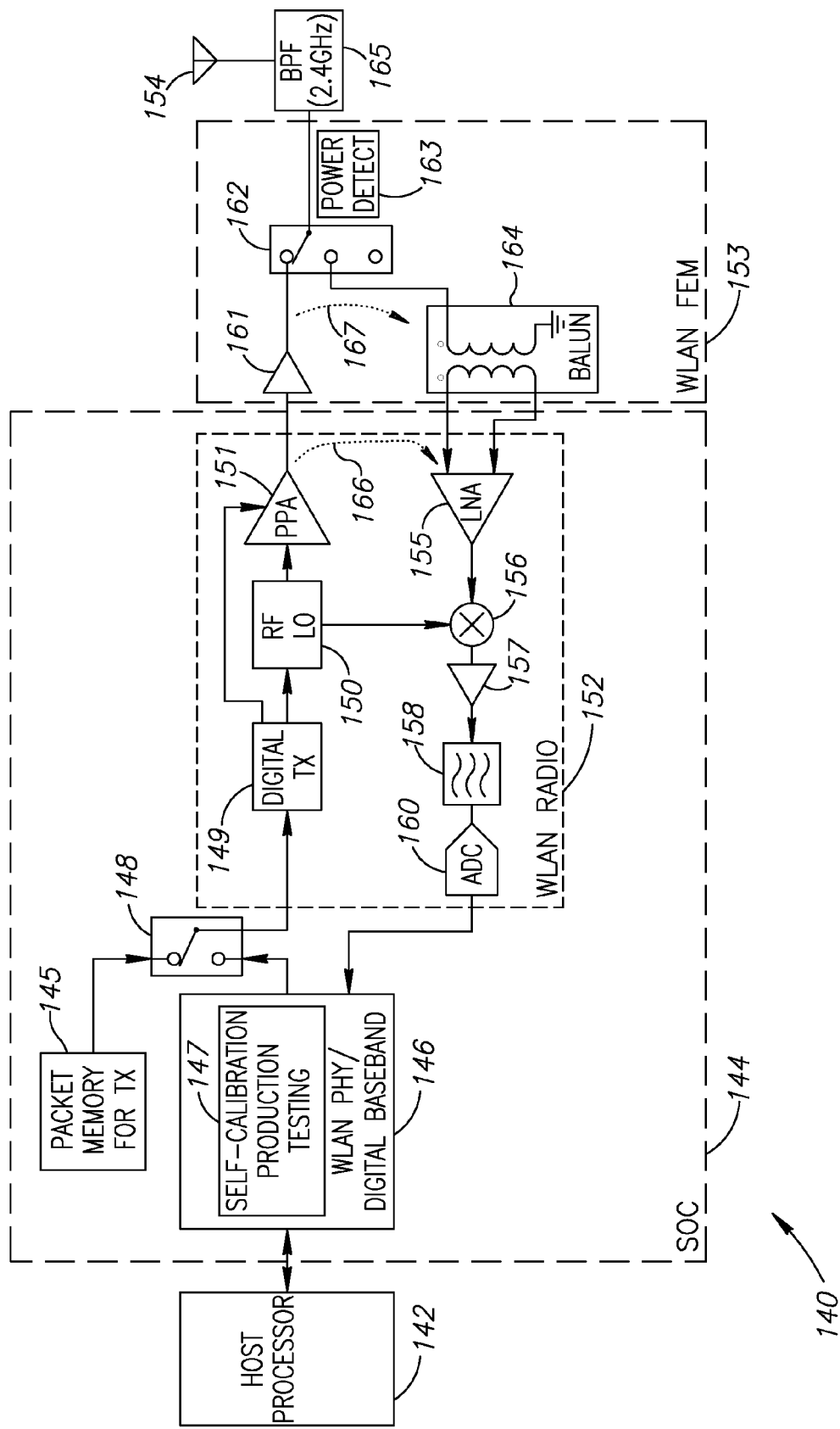
FIG. 5 is a block diagram illustrating the SoC transceiver of the present invention coupled to an external power amplifier front end module (FEM)

A block diagram illustrating the SoC transceiver of the present invention coupled to an external power amplifier front end module (FEM) is shown in FIG. 5. Note that only the components relevant for production line testing of the SoC and the FEM are shown. The SoC and FEM circuit, generally referenced 140, comprises the SoC 144 coupled to host processor 142 and to WLAN FEM 153. The SoC 144 comprises memory (e.g., NVS) 145 for storing packet data to be transmitted during testing, WLAN PHY/digital baseband 146 including self-calibration based production testing block 147, switch 148 and WLAN radio 152. The WLAN radio 152 comprises a digital transmitter 149, RF local oscillator (LO) 150 such as the ADPLL described supra and pre-power amplifier (PPA) 151 in the transmit path and LNA 155, downconverter (i.e. mixer) 156, amplifier 157, filter 158 and ADC 160 in the receive path. The WLAN FEM 153 comprises a power amplifier (PA) 161, switch 162, power detect circuit 163 and balun 164. The WLAN FEM is coupled to antenna 154 via band pass filter (BPF) 165.

Figure 6:
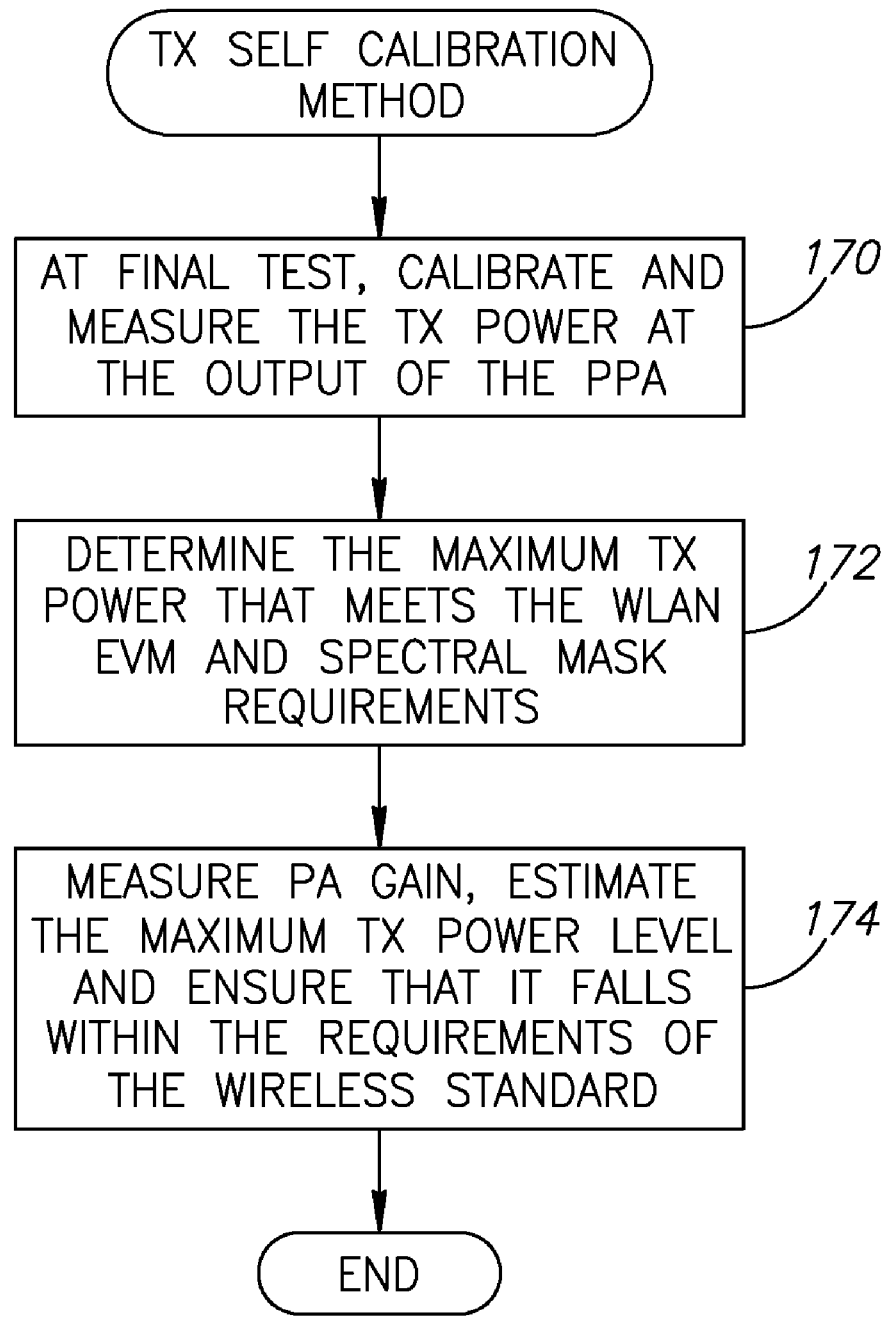
FIG. 6 is a flow diagram of the three phase production line testing method of the present invention.

A flow diagram of the three phase production line testing method of the present invention is shown in FIG. 6. The production line testing mechanism of the invention is divided into three phases, namely (1) PPA calibration; (2) maximum PPA TX power determination; and (3) PA calibration and maximum PA power determination. It is not critical that the three phases be implemented together, each can be implemented at different times. For example, the first phase of PPA calibration may be performed during fabrication and test of the single chip radio SoC incorporating the transmitter and receiver components, while the second and third phases may be performed at a different time after the single chip radio is inserted in a circuit incorporating an external PA. Each of the three phases will now be described in more detail.

Phase 1

PPA Calibration

Figure 7:
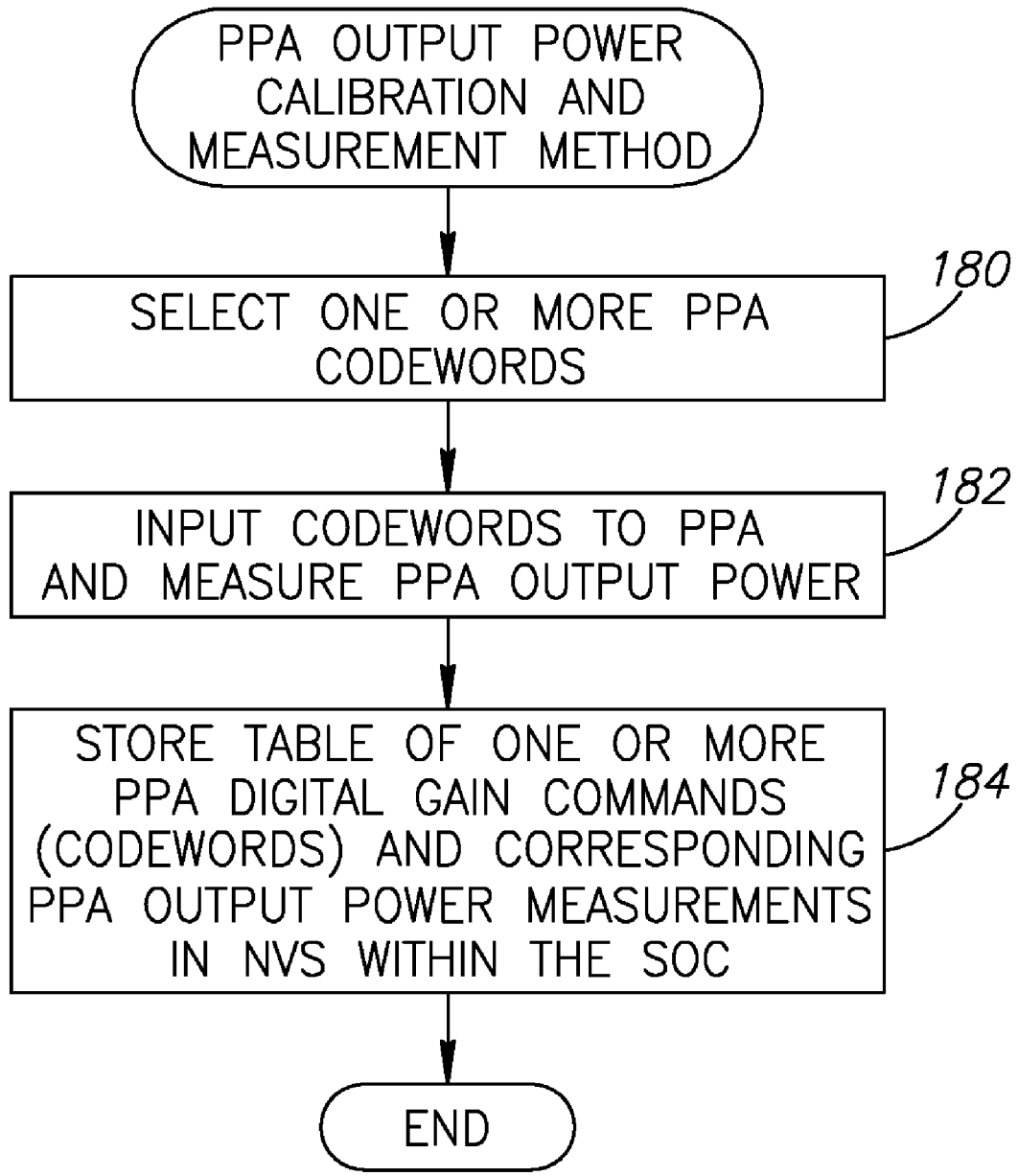
FIG. 7 is a flow diagram of the first phase of the phase production line testing method of the present invention.

A flow diagram of the first phase of the phase production line testing method of the present invention is shown in FIG. 7. This phase is performed at some point in the final testing (i.e. in the semiconductor manufacturing facility) of the SoC single chip radio. Every SoC device (including the PHY and radio transceiver) is functionally tested and calibrated. The TX power at the output of the PPA on the SoC is calibrated and output power is measured using a very accurate power meter. The measurements are stored in an on-chip (or off-chip) PPA gain table. The contents of the PPA gain table are used in the second and third phases.

First, one or more PPA codewords (i.e. gain) are selected (step 180). The codewords are input to the transmitter PPA and the power output of the PPA is measured, preferably using a very accurate external power meter) (step 182). The PPA digital gain commands (i.e. codewords) and their corresponding output power measurements are stored in the PPA gain table (step 184). The PPA gain table is stored in non-volatile storage (NVS) on the SoC. Alternatively, the PPA gain table may be stored off-chip in an external memory storage device.

Phase 2

Maximum PPA TX Power Determination

In phase two, the maximum PPA TX output power that meets the wireless standard requirements is determined. In the example case of WLAN, using closed loop EVM measurements, the TX power is adjusted until a maximum is found that meets the WLAN EVM and spectral mask requirements. During phase two, the PHY (e.g., WLAN PHY) operates in TX and RX modes simultaneously. In order to operate simultaneously, both receiver and transmitter must utilize the same IF frequency. In the example of WLAN, zero IF (ZIF) is used wherein the same local oscillator (LO) is used for both direct upconversion to RF and direct downconversion to baseband. Although ZIF is used in the case of WLAN, it is not a requirement, only that the same IF is used for both TX and RX.

Figure 8:
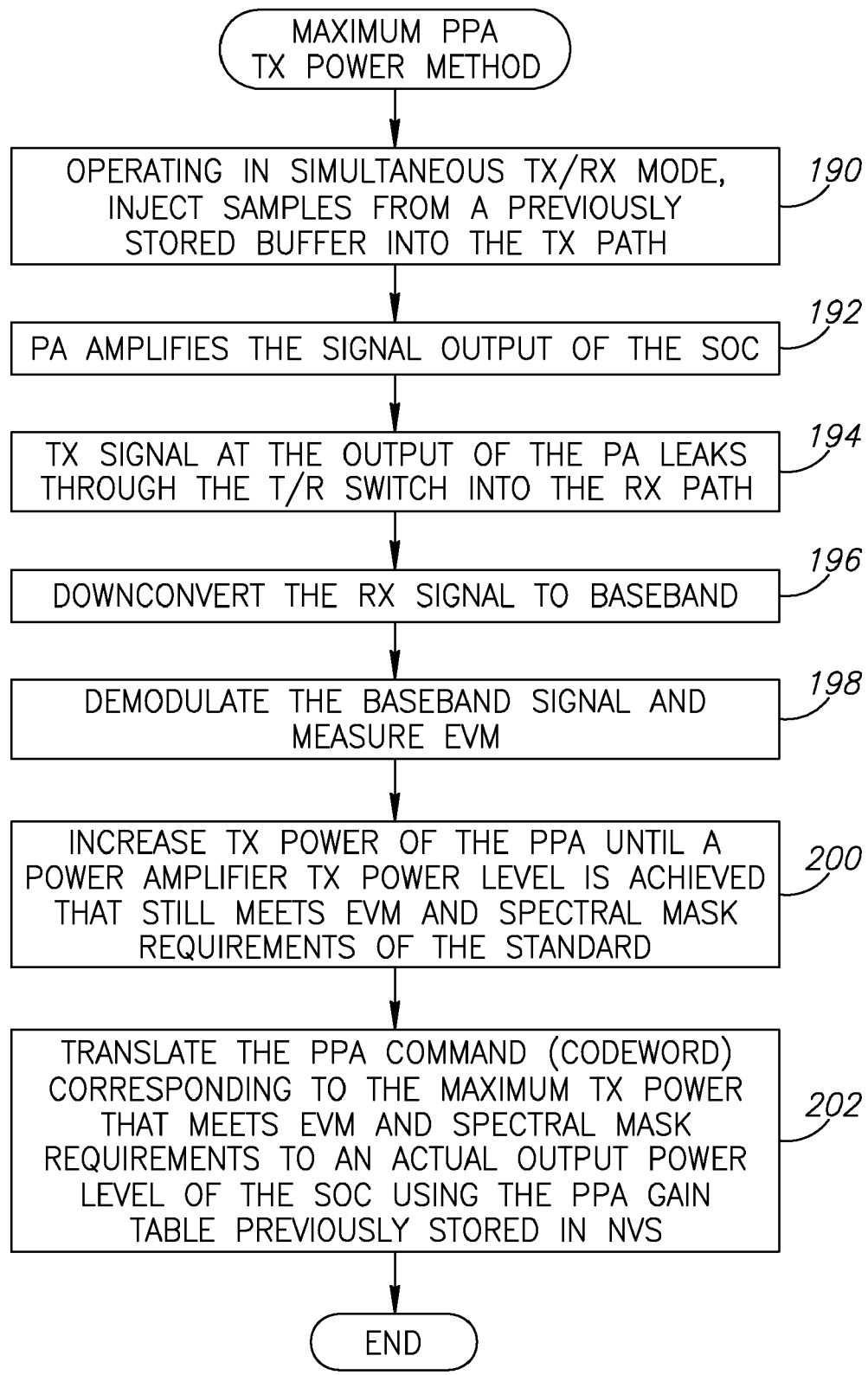
FIG. 8 is a flow diagram of the second phase of the phase production line testing method of the present invention.

A flow diagram of the second phase of the phase production line testing method of the present invention is shown in FIG. 8. Operating in simultaneous TX and RX, samples from a buffer are injected into the TX path (step 190). The buffer memory of samples may be located on the SoC (e.g., NVS 145 in FIG. 5) or stored in external memory. Alternatively, they may be generated in real-time using other means. The stored samples comprise a 'recording' of a packet of random data to be transmitted. The recording comprises all the elements normally present in a packet, e.g., preamble, header, payload, etc.

Once injected, the transmitted signal is output of the PPA and amplified by the external power amplifier, with TX power up to 20 dBm in the case of BPSK, for example (step 192). The transmitted signal at the output of the power amplifier leaks through the T/R switch into the RX path (step 194), as highlighted by the dotted arrow 167 (FIG. 5). In the example FEM shown herein, there may be as much as 25-30 dB of leakage through the T/R switch. Additionally, the TX signal output by the PPA may be coupled to the input of the LNA in the RX path directly on the SoC, as highlighted by the dotted arrow 166 (FIG. 5). It is noted that although the transmitted signal is tuned to a high signal level, the leakage is attenuated to a level well below the saturation power of the power amplifier (e.g., 18 dBm), i.e. the signal is received at +18−30=−12 dBm at the input to the LNA in the RX path. The signal at the input of the LNA will be attenuated enough so as not to compress the receiver, i.e. no intermodulation effects. Although the signal is attenuated, however, the signal level is sufficient for demodulation.

At the receiver, the signal is downconverted with zero-IF to baseband (step 196). The modem then demodulates the signal and measures EVM (step 198). In addition to the EVM, the absolute value of the bins of the output of the FFT within the demodulator are stored and used to determine the spectral mask.

The TX power of the PPA output in the transmitter is increased (e.g., ramp, etc.) and the EVM and spectral mask are measured at the receiver. The PPA output power is increased until a power amplifier TX power level is obtained that just meets the EVM and spectral mask requirements of the standard as measured by the receiver (step 200). Considering the 802.11g standard as an example, the EVM must be less then −2 dB and the spectral mask −40 dBr at an offset of 20 MHz. The PPA codeword (i.e. command) corresponding to the maximum TX power that meets the EVM and spectral mask requirements is translated to an actual PPA output power level of the SoC (step 202). This maximum TX PPA output power level is determined using the PPA gain table information previously stored in NVS in the SoC.

Phase 3

PA Calibration and Maximum PA Power Determination

Figure 9:
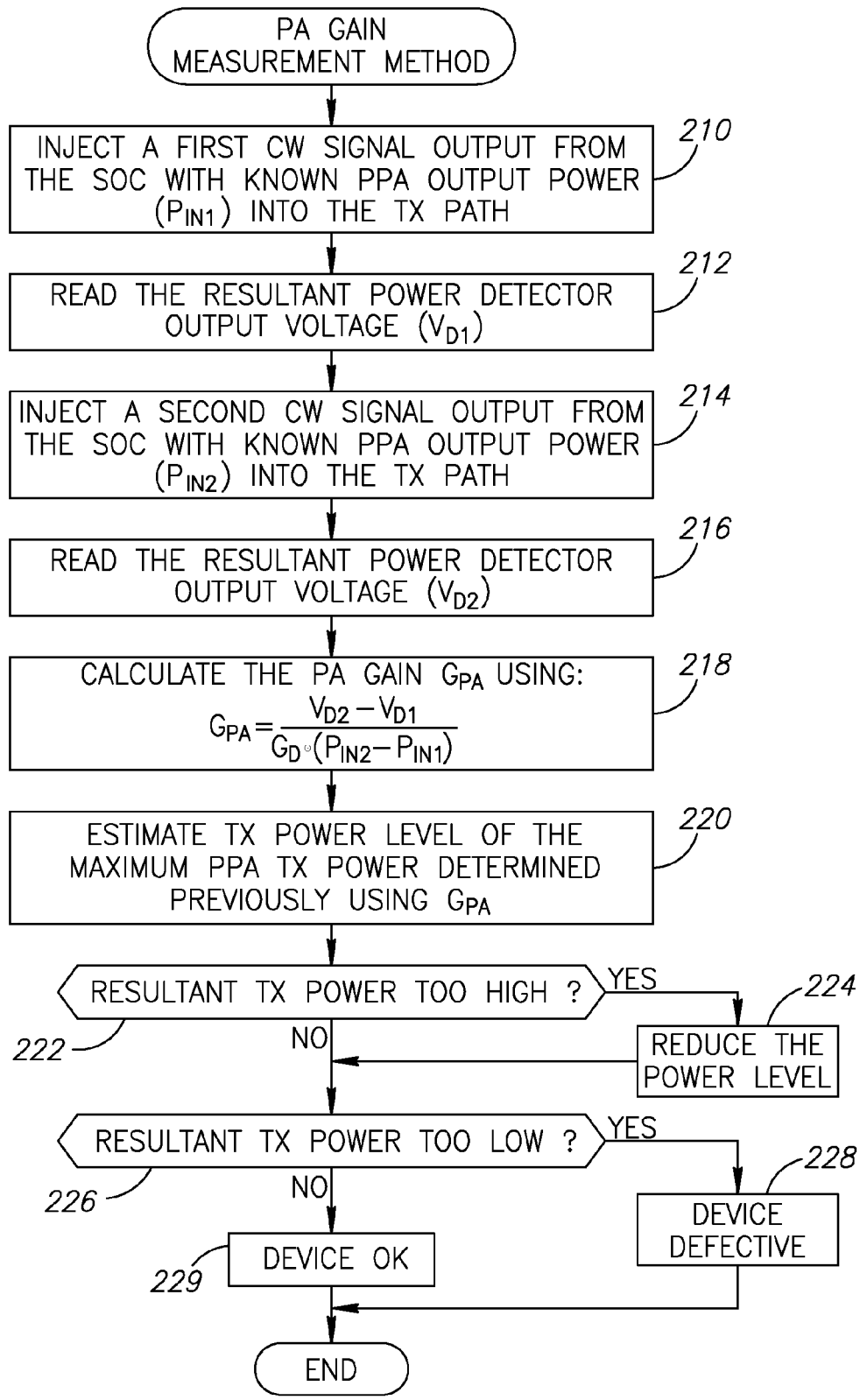
FIG. 9 is a flow diagram of the third phase of the phase production line testing method of the present invention.

In the third phase, the gain of the external power amplifier is measured and used to estimate the maximum TX power. Note that this third phase assumes a known gain $G_D$ for the power detector in the FEM. A flow diagram of the third phase of the phase production line testing method of the present invention is shown in FIG. 9. First, continuous wave (CW) signal having a predetermined frequency is injected from the SoC with a known SoC PPA output power level into the TX path (step 210). The power level of the injected signal is referred to as $P_{IN1}$. The resultant voltage level at the output of the power detector is then read (step 212). The voltage level read is referred to as $V_{D1}$.

CW at the same frequency but with a slightly higher power level (e.g., 3 dB higher) is then injected from the SoC with a known SoC PPA output power level into the TX path (step 214). The power level of the second injected signal is referred to as $P_{IN2}$. The resultant voltage level at the output of the power detector is then read (step 216). The voltage level read is referred to as $V_{D2}$.

The gain $G_{PA}$ of the power amplifier is then calculated using the following equation (step 218):

$$G_{PA} = \frac{V_{D2} - V_{D1}}{G_D \cdot (P_{IN2} - P_{IN1})} \quad (1)$$

where $G_{PA}$ is the gain of the power amplifier;

$G_D$ is the gain of the power detector in the FEM;

$P_{IN1}$, $P_{IN2}$ are the input power of the first and second CW signals, respectively, that are injected into the TX path;

$V_{D1}$, $V_{D2}$ are the first and second power detector voltage readings, respectively;

A derivation of the expression for the power amplifier gain presented in Equation 1 above will now be presented. The following assumptions are applicable to the derivation, as follows. The detector gain is defined as $G_D$ and is typically a known entity as it is provided by the FEM manufacturer. Preferably, the detector variance of the detector gain is less then 5%. The output voltage of the detector is defined to as $V_D$ and the power amplifier gain is defined as $G_{PA}$.

$$P_O = G_{PA} P_I \Rightarrow V_O^2 = G_{PA} V_I^2 \quad (2)$$

The output power is proportional to the input power, wherein the constant C effectively can be considered a bias:

$$V_D = G_D V_O^2 + C = V_I^2 G_{PA} G_D + C \quad (3)$$

The power detector voltage is proportional to the output power as given below:

$$V_{D1} = G_D P_{OUT1} + C = G_{PA} G_D P_{IN1} + C \quad (4)$$

$$V_{D2} = G_D P_{OUT2} + C = G_{PA} G_D P_{IN2} + C \quad (5)$$

wherein $V_{D1}$ is the detector voltage output at $P_{OUT1}$ and $V_{D2}$ is the detector voltage output at $P_{OUT2}$.

From Equations 4 and 5 and several measurements of $V_D$ when injecting a known $V_I$, the constant C can be eliminated and the power amplifier gain ($G_{PA}$) can be found using the following:

$$V_{D2} - V_{D1} = G_{PA} \cdot G_D \cdot (P_{IN2} - P_{IN1}) \quad (6)$$

Rearranging yields Equation 1 given above $$G_{PA} = \frac{V_{D2} - V_{D1}}{G_D \cdot (P_{IN2} - P_{IN1})} \quad (1)$$

The power amplifier gain is therefore determined as a function of the detector gain, input power levels and voltage output measurements of the detector.

Using the above expression for power amplifier gain and the maximum PPA TX power level stored previously, the PA TX power level in dBm corresponding to the maximum PPA TX power level at the output of the SoC is then estimated (step 220). The maximum PPA TX power level is multiplied by the power amplifier gain calculated using Equation 1 and $10 \log_{10}$ of the result is calculated to yield a power level in dBm.

If the resultant PA TX power exceeds the requirements specified in the standard, i.e. is higher than an upper threshold, (step 222), then the PPA power level is reduced until the PA TX output power meets the requirements (step 224). This is achieved by reducing the codeword corresponding to the maximum PPA TX power level. If the resultant PA TX power is lower than the specification (i.e. lower threshold) by more than a predetermined threshold (step 226), then the device is declared defective and is to be rejected (step 228). If the resultant PA TX power is lower than the upper threshold and higher than the lower threshold, than the device is declared OK and passes the test (step 229).

For example, consider an SoC output power level of −10 dBm that was found when the maximum TX power level was calibrated to achieve maximum EVM. The power amplifier gain is estimated to be 25 dB. The resultant maximum TX output power is then estimated to be −10+25=+15 dBm. Note that assuming the parameters used to calibrate the PPA, determine the contents of the PPA gain table and to estimate the PA gain are accurate, a $G_D$ accuracy of ±5% is required to achieve a GP, accuracy of ±2%.

Figure 10:
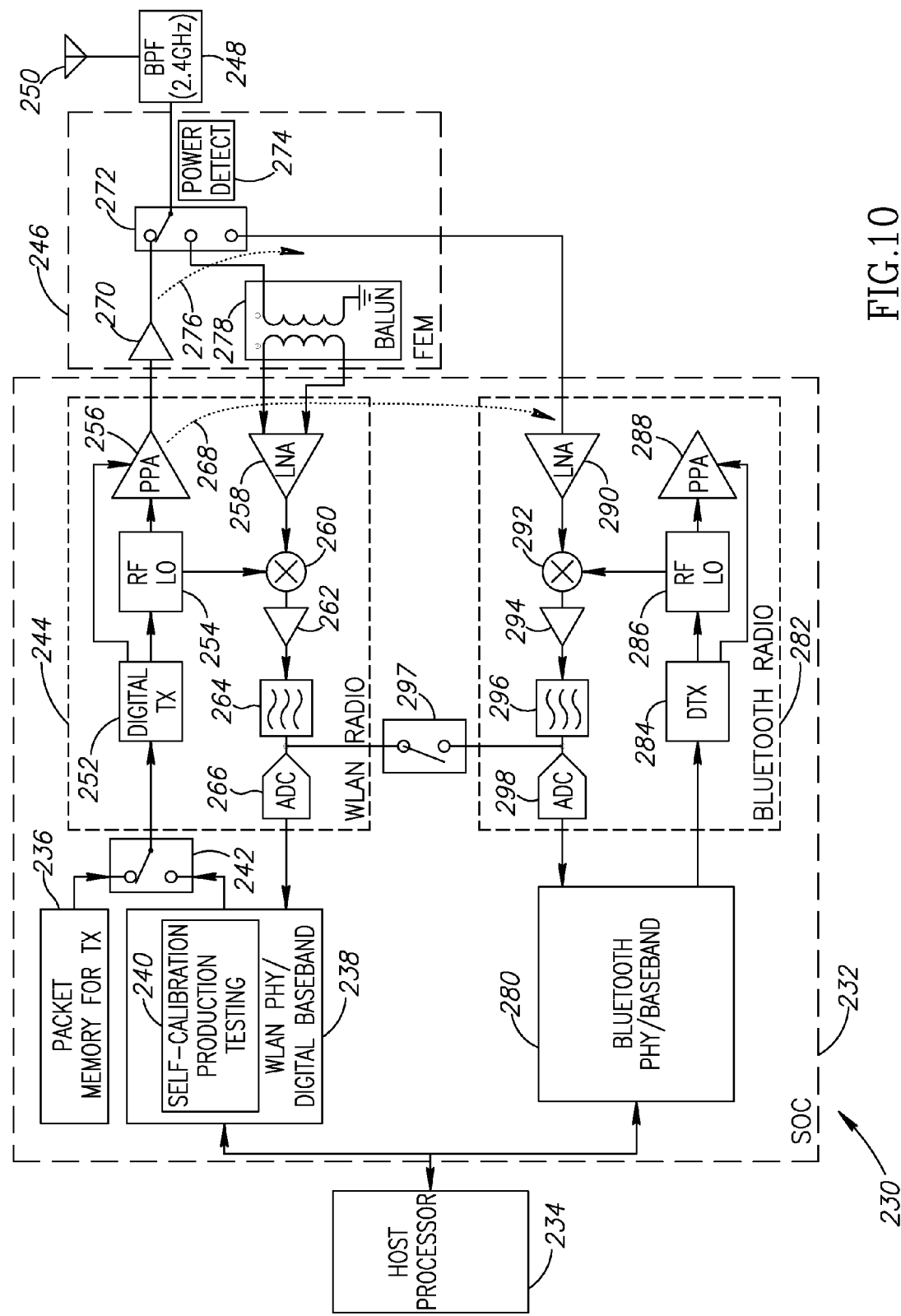
FIG. 10 is a block diagram illustrating an alternative embodiment of the SOC transceiver of the present invention.

A block diagram illustrating an alternative embodiment of the SOC transceiver of the present invention coupled to an external power amplifier FEM is shown in FIG. 10. In this alternative embodiment, the TX path of WLAN radio is used in combination with the Bluetooth RX path rather than the WLAN RX path. The Note that only the components relevant for production line testing of the SoC and the FEM are shown. The SoC and FEM circuit, generally referenced 230, comprises the SoC 232 coupled to host processor 234 and to FEM 246. The SoC 232 comprises memory (e.g., NVS) 236 for storing packet data to be transmitted during testing, WLAN PHY/digital baseband circuit 238 including self-calibration based production testing block 240, Bluetooth PHY/baseband circuit 280, switch 242, WLAN radio 244 Bluetooth radio 282 and switch 297.

The WLAN radio 244 comprises a digital transmitter 252, RF local oscillator (LO) 254 such as the ADPLL described supra and pre-power amplifier (PPA) 256 in the transmit path and LNA 258, downconverter (i.e. mixer) 260, amplifier 262, filter 264 and ADC 266 in the receive path. The Bluetooth radio 282 comprises a digital transmitter 284, RF local oscillator (LO) 286 such as the ADPLL described supra and pre-power amplifier (PPA) 288 in the transmit path and LNA 290, downconverter (i.e. mixer) 292, amplifier 294, filter 296 and ADC 298 in the receive path. The FEM 246 comprises a power amplifier (PA) 270, switch 272, power detect circuit 274 and balun 278. The FEM is coupled to antenna 250 via band pass filter (BPF) 248.

In operation, the transmit path of the WLAN radio is used to calibrate the FEM with the TX signal being coupled to the Bluetooth receive path via leakage in the T/R switch 272 of the FEM (indicated by dotted arrow 276) and coupling from the WLAN PPA 256 to the input of the Bluetooth LNA 290 (indicated by dotted arrow 268). The received signal output of the filter 296 in the Bluetooth receive path is diverted to the ADC 266 in the WLAN radio receive path for processing by the self-calibration production line testing block 240 in the WLAN PHY/baseband circuit 238.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of calibrating an external power amplifier comprising a power detector, said external power amplifier coupled to the output of a transmitter incorporating a pre-power amplifier (PPA), said method comprising the steps of:
    performing closed loop calibration of an input signal to yield a maximum level of said external power amplifier that is within predetermined transmission requirements;
    measuring a gain of said external power amplifier; and
    calibrating a gain of said power detector.

2. The method according to claim 1, further comprising the step of reducing a maximum PPA codeword if a maximum power amplifier output power level exceeds a maximum threshold.

3. The method according to claim 1, further comprising the step of declaring said transmitter defective if a resultant maximum power amplifier output power level is lower than a minimum threshold.

4. A method of calibrating an external power amplifier comprising a power detector, said external power amplifier coupled to the output of a transmitter incorporating a pre-power amplifier (PPA), said method comprising the steps of:
    performing closed loop calibration of an input signal to yield a maximum level of said external power amplifier that is within predetermined transmission requirements, comprising:
        inputting a plurality of PPA codewords into said transmitter;
        measuring resultant PPA output power;
        storing said codewords and corresponding output power measurements in a PPA gain table;
    measuring a gain of said external power amplifier; and
    calibrating a gain of said power detector.

5. The method according to claim 4, wherein said PPA gain stable is stored in non-volatile storage (NVS).

6. A method of calibrating an external power amplifier comprising a power detector, said external power amplifier coupled to the output of a transmitter incorporating a pre-power amplifier (PPA), said method comprising the steps of:
    performing closed loop calibration of an input signal to yield a maximum level of said external power amplifier that is within predetermined transmission requirements wherein said step of performing closed loop calibration comprises the steps of:
        injecting samples into a transmitter path;
        downconverting and demodulating a receive signal leaked through said external power amplifier; and
        increasing transmit power of said PPA until a maximum power amplifier output level is reached that still meets said predetermined transmission requirements;
    measuring a gain of said external power amplifier; and
    calibrating a gain of said power detector.

7. The method according to claim 6, further comprising translating the PPA codeword corresponding to said maximum output level to a maximum output power level for said transmitter utilizing a PPA gain table.

8. A method of calibrating an external power amplifier comprising a power detector, said external power amplifier coupled to the output of a transmitter incorporating a pre-power amplifier (PPA), said method comprising the steps of:
    performing closed loop calibration of an input signal to yield a maximum level of said external power amplifier that is within predetermined transmission requirements;
    measuring a gain of said external power amplifier comprising:
        injecting a first signal with known PPA output power into a transmit path;
        reading the first resultant output measured by an external power detector;
        injecting a second signal with known PPA output power into said transmit path;
        reading the second resultant output measured by said external power detector; and
        calculating said power amplifier gain as a function of the gain of said power detector, said first signal, said first output, said second signal and said second output; and
    calibrating a gain of said power detector.

9. The method according to claim 8, wherein said function comprises $$G_{PA} = \frac{V_{D2} - V_{D1}}{G_D \cdot (P_{IN2} - P_{IN1})}$$

wherein $V_{D1}$, $V_{D2}$ are said first and second signals, respectively, $P_{IN1}$, $P_{IN2}$ are said first and second outputs, respectively and $G_D$ is the gain of said power detector.

10. A method of calibrating an external power amplifier utilizing a transmitter incorporating a pre-power amplifier (PPA), said method comprising the steps of:
    determining a maximum PPA codeword that yields maximum output power of said external power amplifier (PA) while meeting predetermined transmission requirements and translating said maximum PPA codeword into a maximum PPA output power level utilizing a PPA gain table generated previously; and
    measuring power amplifier gain by injecting signals with known PPA output power into said external power amplifier, calculating a maximum power amplifier output power level as a function of said maximum PPA output power level and adjusting said maximum PPA codeword to meet said predetermined transmission requirements.

11. The method according to claim 10, wherein said step of determining said maximum PPA codeword comprises the steps of:
injecting samples into a transmitter path;
downconverting and demodulating a receive signal leaked through said external power amplifier; and
increasing transmit power of said PPA until a maximum power amplifier output level is reached that still meets said predetermined transmission requirements.

12. The method according to claim 11, further comprising the step of translating the PPA codeword corresponding to said maximum output level to a maximum output power level for said transmitter utilizing said PPA gain table.

13. The method according to claim 10, wherein said step of measuring power amplifier gain comprises the steps of:
injecting a first signal with known PPA output power into a transmit path;
reading the first resultant output measured by an external power detector;
injecting a second signal with known PPA output power into said transmit path;
reading the second resultant output measured by said external power detector; and
calculating said power amplifier gain as a function of the gain of said power detector, said first signal, said first output, said second signal and said second output.

14. The method according to claim 10, wherein said step of adjusting said maximum PPA codeword comprises the step of reducing the maximum PPA codeword if said maximum power amplifier output power level exceeds a maximum threshold.

15. The method according to claim 10, wherein said transmitter is declared defective if the resultant maximum power amplifier output power level is lower than a minimum threshold.

16. A method of calibrating an external power amplifier utilizing a transmitter incorporating a pre-power amplifier (PPA), said method comprising the steps of:
injecting samples into a transmit path;
downconverting and demodulating a receive signal leaked through said external power amplifier;
increasing transmit power of said PPA until a maximum power amplifier output level is reached that still meets said predetermined transmission requirements;
translating said maximum PPA codeword into a maximum PPA output power level utilizing a PPA gain table generated previously;
injecting signals into said transmit path with known PPA output power and determining a gain of said external power amplifier;
calculating a maximum power amplifier output power level as a function of said maximum PPA output power level; and
adjusting said maximum PPA codeword to meet said predetermined transmission requirements.

17. The method according to claim 16, wherein said step of determining said power amplifier gain comprises the steps of:
injecting a first signal with known PPA output power into said transmit path;
reading the first resultant output measured by an external power detector;
injecting a second signal with known PPA output power into said transmit path;
reading the second resultant output measured by said external power detector; and
calculating said power amplifier gain as a function of the gain of said power detector, said first signal, said first output, said second signal and said second output.

18. The method according to claim 16, wherein said step of adjusting said maximum PPA codeword comprises the step of reducing the maximum PPA codeword if said maximum power amplifier output power level exceeds a maximum threshold.

19. The method according to claim 16, wherein said transmitter is declared defective if the resultant maximum power amplifier output power level is lower than a minimum threshold.

20. An apparatus, comprising:
a transmitter incorporating a pre-power amplifier (PPA); a receiver, wherein said transmitter and said receiver are capable of operating simultaneously;
a processor coupled to said transmitter and said receiver, said processor comprising program code means for calibrating an external power amplifier coupled to said transmitter when executed on said processor;
said program code means adapted to:
determine a maximum PPA codeword that yields maximum output power of said external power amplifier (PA) while meeting predetermined transmission requirements and translate said maximum PPA codeword into a maximum PPA output power level utilizing a PPA gain table generated previously; and
measure power amplifier gain by injecting signals with known PPA output power into said external power amplifier, calculate a maximum power amplifier output power level as a function of said maximum PPA output power level and adjust said maximum PPA codeword to meet said predetermined transmission requirements.

21. The apparatus according to claim 20, wherein said processor is operative to reduce said maximum PPA codeword if said maximum power amplifier output power level exceeds a maximum threshold.

22. The apparatus according to claim 20, wherein said processor is operative to declare said transmitter defective if said calculated maximum power amplifier output power level is lower than a minimum threshold.

23. A single chip radio, comprising:
a transmitter incorporating a pre-power amplifier (PPA); a receiver capable of receiving while said transmitter is transmitting;
memory storage coupled to said transmitter;
a processor coupled to said transmitter and said receiver, said processor comprising program code means for operative to calibrate an external power amplifier coupled to said transmitter when executed on said processor; said program code means adapted to:
inject samples from said memory storage into a transmit path;
downconvert and demodulate a receive signal leaked through said external power amplifier;
increase the transmit power of said PPA until a maximum power amplifier output level is reached that still meets said predetermined transmission requirements;
translate said maximum PPA codeword into a maximum PPA output power level utilizing a PPA gain table generated previously;

inject signals stored in said memory storage into said transmit path with known PPA output power and determine a gain of said external power amplifier;

calculate a maximum power amplifier output power level as a function of said maximum PPA output power level; and adjust said maximum PPA codeword to meet said predetermined transmission requirements.

24. The radio according to claim 23, wherein said processor is operative to reduce said maximum PPA codeword if said maximum power amplifier output power level exceeds a maximum threshold.

25. The radio according to claim 23, wherein said processor is operative to declare said transmitter defective if said calculated maximum power amplifier output power level is lower than a minimum threshold.

* * * * *